(12) United States Patent
Plaschka et al.

(10) Patent No.: US 7,040,663 B1
(45) Date of Patent: May 9, 2006

(54) VALUE DOCUMENT

(75) Inventors: Reinhard Plaschka, Windach (DE); Eckhard Braun, Munich (DE); Wittich Kaule, Emmering (DE)

(73) Assignee: Giesecke & Devrient, GmbH, Munich (DE)

( * ) Notice: Subject to any disclaimer, the term of this patent is extended or adjusted under 35 U.S.C. 154(b) by 0 days.

(21) Appl. No.: 09/926,062

(22) PCT Filed: Feb. 22, 2000

(86) PCT No.: PCT/EP00/01428

§ 371 (c)(1),
(2), (4) Date: Nov. 19, 2001

(87) PCT Pub. No.: WO00/50249

PCT Pub. Date: Aug. 31, 2000

(30) Foreign Application Priority Data

Feb. 23, 1999 (DE) ................ 199 07 697

(51) Int. Cl.
*B42D 15/00* (2006.01)
*B42D 15/10* (2006.01)

(52) U.S. Cl. ............... 283/72; 283/82; 283/83; 283/84; 283/90; 283/113; 283/114; 283/901; 283/902; 428/64.1; 428/195; 428/195.1; 428/209; 428/323; 428/916; 359/2; 235/493; 235/494; 340/572.8

(58) Field of Classification Search ........... 283/72, 283/82, 83, 84, 90, 902, 901, 113, 114; 428/195, 428/916, 64.1, 195.1, 209, 323; 359/2; 235/493, 235/494; 340/572.8
See application file for complete search history.

(56) References Cited

U.S. PATENT DOCUMENTS

| 4,428,997 | A |   | 1/1984  | Shulman               |
|-----------|---|---|---------|-----------------------|
| 4,514,085 | A |   | 4/1985  | Kaye                  |
| 4,631,222 | A |   | 12/1986 | Sander                |
| 5,166,283 | A |   | 11/1992 | Nishikawa et al.      |
| 5,248,544 | A | * | 9/1993  | Kaule ........... 428/195.1 |
| 5,362,315 | A |   | 11/1994 | Müller-Rees et al.    |
| 5,388,862 | A | * | 2/1995  | Edwards ........... 283/82 |
| 5,422,744 | A |   | 6/1995  | Katz et al.           |
| 5,433,807 | A |   | 7/1995  | Heckenkamp et al.     |
| 5,458,713 | A | * | 10/1995 | Ojster ........... 156/234 |
| 5,492,370 | A | * | 2/1996  | Chatwin et al. ........... 283/110 |
| 5,599,047 | A | * | 2/1997  | Kaule et al. ........... 283/85 |

(Continued)

FOREIGN PATENT DOCUMENTS

CA 2032587 6/1991

(Continued)

OTHER PUBLICATIONS

CA 1212021 Abstract, Tagging Means for Finely Dispersed Systems, downloaded from esp@cenet Ansicht Jun. 15, 2004 at http://v3.espacenet.com/textdoc? DB=EPODOC &IDX=CA1212021&QPN=CA1212021.

(Continued)

*Primary Examiner*—Boyer Ashley
*Assistant Examiner*—Mark Henderson
(74) *Attorney, Agent, or Firm*—Bacon & Thomas, PLLC

(57) ABSTRACT

The invention relates to a document of value such as a paper of value or ID card with a security element having an optically variable material. Said optically variable material conveys different color effects at different viewing angles. Additionally, the security element has at least one machine-readable feature substance that does not impair the visually visible optically variable effect of the optically variable material.

6 Claims, 5 Drawing Sheets

U.S. PATENT DOCUMENTS

| | | | |
|---|---|---|---|
| 5,631,039 A | | 5/1997 | Knight et al. |
| 5,678,863 A | * | 10/1997 | Knight et al. ............... 283/113 |
| 5,714,231 A | | 2/1998 | Reinhart |
| 5,808,758 A | * | 9/1998 | Solmsdorf ...................... 359/2 |
| 5,851,604 A | | 12/1998 | Müller-Rees et al. |
| 5,882,463 A | * | 3/1999 | Tompkin et al. ............. 156/234 |
| 6,036,232 A | * | 3/2000 | Kaule et al. ................... 283/85 |
| 6,060,143 A | * | 5/2000 | Tompkin et al. ........... 428/64.1 |
| 6,155,605 A | * | 12/2000 | Bratchley et al. ............. 283/72 |
| 6,183,018 B1 | * | 2/2001 | Braun et al. ................. 283/114 |
| 6,243,204 B1 | * | 6/2001 | Bradley et al. ............. 359/585 |
| 6,255,948 B1 | * | 7/2001 | Wolpert et al. ........... 340/572.8 |
| 6,283,509 B1 | * | 9/2001 | Braun et al. ................... 283/91 |
| 6,284,396 B1 | | 9/2001 | Kaule et al. |
| 6,318,758 B1 | * | 11/2001 | Stenzel et al. ................. 283/91 |
| 6,343,745 B1 | * | 2/2002 | Bohm et al. ................. 235/493 |
| 6,379,779 B1 | * | 4/2002 | Murl ....................... 428/195.1 |
| 6,413,687 B1 | * | 7/2002 | Hattori et al. ................. 430/10 |
| 6,444,377 B1 | * | 9/2002 | Jotcham et al. ............... 430/10 |
| 6,454,166 B1 | * | 9/2002 | Stenzel et al. ............... 235/449 |
| 6,491,324 B1 | * | 12/2002 | Schmitz et al. ............... 283/82 |
| 6,570,648 B1 | | 5/2003 | Müller-Rees et al. |
| 6,616,190 B1 | * | 9/2003 | Jotcham .................... 503/200 |
| 2003/0012935 A1 | * | 1/2003 | Kuntz et al. ................. 428/209 |
| 2003/0157305 A1 | * | 8/2003 | Abraham ................. 428/195.1 |
| 2003/0164611 A1 | * | 9/2003 | Schneider et al. ............ 283/57 |
| 2004/0081807 A1 | * | 4/2004 | Bonkowski et al. ..... 428/195.1 |
| 2004/0101676 A1 | * | 5/2004 | Phillips et al. ............. 428/323 |
| 2004/0241400 A1 | * | 12/2004 | Friedl et al. ................ 428/202 |
| 2004/0247874 A1 | * | 12/2004 | Ryzi et al. .................. 428/410 |
| 2005/0012326 A1 | * | 1/2005 | Keller et al. ................... 283/94 |
| 2005/0067497 A1 | * | 3/2005 | Jones et al. ................. 235/492 |
| 2005/0118396 A1 | * | 6/2005 | Isherwood et al. .......... 428/164 |
| 2005/0150740 A1 | * | 7/2005 | Finkenzeller et al. ....... 194/207 |
| 2005/0240549 A1 | * | 10/2005 | Adamczyk et al. ............ 707/1 |

FOREIGN PATENT DOCUMENTS

| | | |
|---|---|---|
| CA | 2032587 | 7/1996 |
| CA | 2238743 | 6/1997 |
| DE | 34 22 910 | 9/1985 |
| DE | 3301357 C1 | 1/1987 |
| DE | 3741179 A1 | 6/1989 |
| DE | 39 42 663 | 6/1991 |
| DE | 43 13 521 | 6/1994 |
| DE | 4240743 A1 | 6/1994 |
| DE | 4327995 A1 | 2/1995 |
| DE | 4416191 A1 | 11/1995 |
| DE | 69208945 T2 | 10/1996 |
| DE | 195 29 171 | 2/1997 |
| DE | 195 48 528 | 6/1997 |
| DE | 196 39 229 | 6/1997 |
| DE | 196 11 383 | 9/1997 |
| DE | 38 56 001 | 3/1998 |
| DE | 197 18 859 | 11/1998 |
| DE | 197 31 968 | 1/1999 |
| DE | 197 37 618 A1 | 3/1999 |
| DE | 695 05 539 | 6/1999 |
| EP | 0 071 160 A2 | 2/1983 |
| EP | 0 118 667 B1 | 9/1984 |
| EP | 0 227 423 A2 | 7/1987 |
| EP | 0 340 898 B1 | 11/1989 |
| EP | 0 383 376 | 8/1990 |
| EP | 0 518 740 B1 | 12/1992 |
| EP | 0 604 900 | 7/1994 |
| EP | 0 657 297 A1 | 6/1995 |
| EP | 0 683 471 | 11/1995 |
| EP | 0 779 863 B1 | 6/1997 |
| EP | 0 806 457 | 11/1997 |
| FR | 2 698 390 | 5/1994 |
| GB | 1534403 * | 12/1978 |
| JP | 09267592 A | 10/1997 |
| JP | 10058870 A | 3/1998 |
| WO | 90/13877 | 11/1990 |
| WO | 93/125 06 | 6/1993 |
| WO | 95/05945 | 3/1995 |

OTHER PUBLICATIONS

"Counterfeit Banknotes", POSTnote, vol. 77, Mar. 1996.

"Know Your Money", United States Secret Service, downloaded from http://www.secretservice.gov/money_design_features1996.shtml, Jun. 4, 2004.

Makow, David: Reflection and Transmission of Polymer Liquid-Crystal Coatings and Theier Application to Decorative Arts and Stained Glass; In: Color research and application; vol. 11, No. 3, 1986, S. 205-208.

* cited by examiner

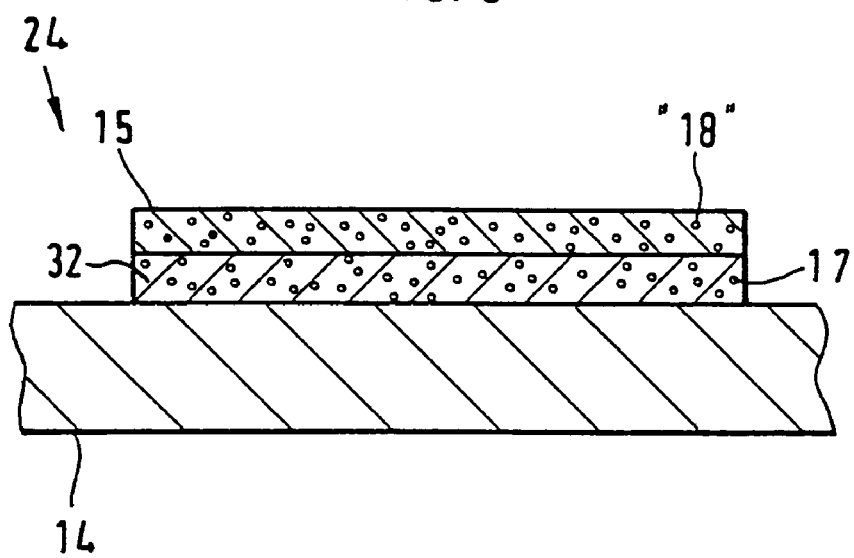
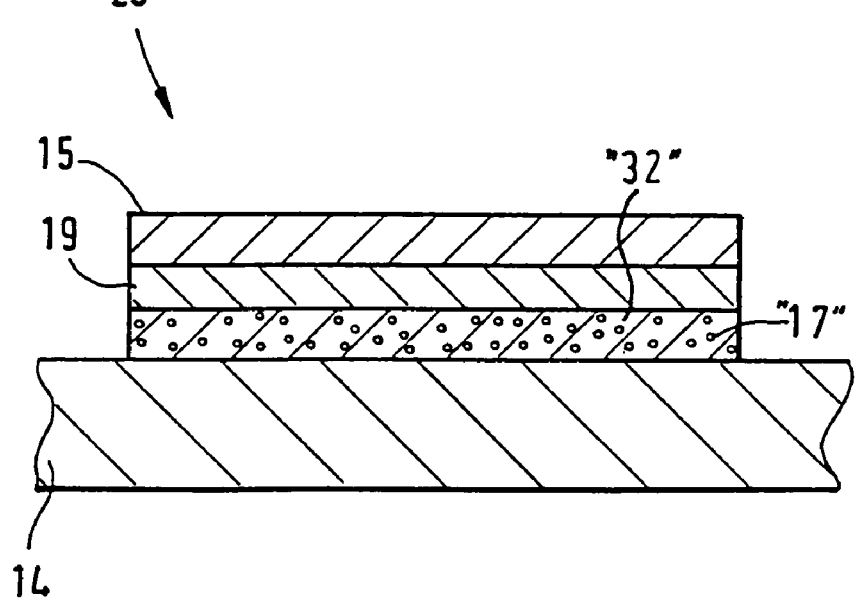

VALUE DOCUMENT

BACKGROUND

This invention relates to a document of value such as a paper of value or ID card with a security element having an optically variable material that conveys different color effects at different viewing angles. The invention further relates to a foil, a multilayer transfer material and a printing ink with such an optically variable material.

In view of the high quality of color copies it is necessary to provide documents of value such as bank notes, ID cards or the like with additional security elements that are uncopiable or not copiable true to the original. For this purpose one frequently uses optically variable devices such as holograms, interference layer elements or liquid-crystal materials that convey different color effects at different viewing angles. The interplay of colors of said devices constitutes a very striking, visually easily recognized security feature so that a photocopy not having said interplay of colors can be distinguished from an original document very easily even by a layman. However, optically variable devices are accessible to machine testing only under certain conditions and with high technical effort.

EP 0 435 029 B1 describes a document of value with an optically variable, liquid-crystal security feature. One uses as security elements in particular liquid-crystal polymers that constitute a plastic-like solid with a distinctive color change at room temperature after suitably oriented production. They can be used to produce different types of security elements. One can thus coat plastic foils with a layer of liquid-crystal polymers and then cut the resultant sheet of material into narrow bands or threads that can be embedded in paper or other materials as security threads. It is also proposed in EP 0 435 029 B1 to produce transfer bands containing in their layer structure a layer of liquid-crystal polymers. Besides optically variable properties, liquid-crystal materials also possess light-polarizing properties that are exploited to make the security element additionally accessible to machine testing. Since light polarization is only a weak effect that is greatly impaired by environmental influences such as dirt, folds or bends in the document of value, however, the measuring effort for reliable automated testing is very high.

SUMMARY

The invention is therefore based on the problem of proposing a document of value with an optically variable security element having not only a visually well recognized optically variable effect but also improved machine-readability.

The invention is based on the surprisingly simple idea of not improving the machine-readability of the optically variable material itself but combining the optically variable material with at least one feature substance that is easily and reliably machine-readable while not impairing the visually visible, optically variable effect of the optically variable material. Accordingly, the inventive security element has an optically variable material that conveys different color effects at different viewing angles, and a feature substance that does not impair the visually visible, optically variable effect of the optically variable material and is machine-testable. The security element can be prepared as a separate element and then connected with the object of value to be protected, or produced directly on the object of value, for example in the form of a printed image.

As a feature substance one can use for example luminescent substances, electrically conductive polymers or carbon blacks, IR-absorbent substances, but also magnetic materials or thermochromic materials. Preferably, one uses feature substances transparent in the visible spectral region.

In the case of luminescent substances, suitable ones are specifically substances luminescing outside the visible spectral region with narrow emission bands that are very well detectable by machine. One preferably uses inorganic luminescent substances, but depending on the application it may also be expedient to use other luminescent substances.

Magnetic materials frequently possess a black or dark inherent color. If the quantity concentration is accordingly dosed, however, they can nevertheless be used very advantageously as a feature substance in accordance with the invention. The dark magnetic materials absorb the diffuse stray radiation in the surroundings of the optically variable material, thereby strengthening the brilliance of the optically variable effect.

As an optically variable material one can use for example liquid-crystal materials, preferably liquid-crystal polymer materials or also interference layer materials. It has proved especially advantageous if the optically variable material is present in the form of pigments or particles with a suitable particle size, distribution and shape factor since the latter can be admixed to any other materials. One can choose between pigments with body color and ones without body color. The latter are largely transparent so that their color effect is greatly codetermined by the background. But one can also use microencapsulated liquid crystals.

According to a preferred embodiment, the security element consists of a color layer applied at least in partial areas of the document of value. The color layer consists at least of a binder and liquid-crystal pigments dispersed therein as well as feature substances. If the color layer is applied by a printing process, for example screen printing, flexography or intaglio printing, the printing ink contains optically variable pigments in 10 to 30 wt % and feature substance in 0.01 to 30 wt % based on the binder, depending on the feature substance used. If the feature substance used is a luminescent substance, one adds 0.01 to 30 wt %, preferably 0.01 to 10 wt %, in the case of magnetic materials 5 to 80 wt %, preferably 10 to 20 wt %. If electrically conductive polymers are used for the feature substance, the electrically conductive polymer can also form the binder of the color layer.

Alternatively, the security element can also be present in the form of a thread or band that is either disposed completely on the surface of the document of value or freely accessible only partially on the surface of the document of value as a so-called window security thread. The security element in this case has a plastic material containing for example the optically variable material and feature substance. Alternatively, one can apply a color layer containing the optically variable material and feature substance to the plastic material at least in certain areas. According to another variant, the security element has an electrically conductive plastic material on or in which the optically variable material is disposed.

According to another embodiment of the invention, the security element can also consist of a plastic foil containing the optically variable material and feature substance. Said plastic foil can be used for example as a protective layer for certain areas of the document of value or as an all-over cover foil, for example in the case of ID cards.

It is likewise possible to add the optically variable material and feature substance to plastic pellets that are then processed into finished plastic parts. This can be done for example by extrusion or injection molding.

Finally, it is also possible to form the security element as a multilayer transfer element in whose layer structure the optically variable material and feature substance are disposed. The transfer element can be executed as a self-supporting label consisting of a carrier layer on or in which the optically variable layer and feature substance are disposed. Alternatively, the transfer element can have no carrier layer. In this case the transfer element is produced with the aid of a hot stamping foil whose carrier band is removed after transfer of the transfer element, i.e. the security element.

Feature substance and optically variable material need not fundamentally be applied simultaneously to the object of value, however. One can for example first apply the feature substance and then dispose the optically variable material there-over. This procedure is especially advantageous if the feature substance used is dark magnetic material or electrically conductive carbon black and the optically variable material is largely transparent material without, or with little, body color. In this case the feature substance is first applied in the form of a printed image and then in the same area a layer of optically variable material that may also cover gaps present in the printed image of the feature substance. Since the dark background absorbs the radiation passing through the optically variable material as well as stray radiation, the optically variable effect is especially evident in the area of the magnetic printed image.

The forgery-proofness of this security element can be additionally increased if a magnetic material is used as the feature substance and carbon black is admixed to the magnetic layer. Concentrations of 1 to 5 wt % of carbon black already yield good electric conductivity that is readily detectable by machine.

Another way of additionally increasing forgery-proofness is to apply the feature substance in the form of a coding or alphanumeric information. In the simplest case, the coding is a bar code. If the coding is not to be visually visible, the surroundings of the coding can be provided in register with a camouflage layer that cannot be distinguished visually from the coding but contains no feature substance. Such camouflaging may also be expedient if the layer containing feature substance is transparent since the layer might be recognizable at a glancing angle.

During machine testing of the security element, several different properties can be evaluated. Most optically variable materials, in particular liquid-crystal materials, are transparent in the IR spectral region. If said materials are combined with a luminescent substance transparent in the visible spectral region and emitting in the IR spectral region, the spectral response in the visible and infrared wave ranges can be evaluated to detect the optically variable material during machine testing. Simultaneously, one must test at the same place the special physical property, for example luminescence or electric conductivity of the feature substance.

If the feature substance is not transparent, one can nevertheless apply the same measuring principle. In this case one uses as a reference value the superposition of the spectra of optically variable material and feature substance in the visible spectral region.

The optically variable material can finally also be combined with thermochromic materials whose color change can be detected with a suitable optical sensor. As thermochromic materials one can use for example suitable liquid-crystal materials that show a defined color change and have short reaction times.

The forgery-proofness of the inventive security element can finally be increased further by using a plurality of optically variable materials and/or feature substances that may be disposed in the same or different layers of the security element.

If a liquid-crystal material is used as an optically variable material, additional information can also be incorporated in this layer. Liquid crystals have the property of dispersing unpolarized incident light into components with different polarization. Depending on the chemical composition of the liquid-crystal material, only one of these components is reflected. This property can be used according to the invention for representing information. For example, one can produce any desired information with a printing ink containing left-handed liquid-crystal material. The surroundings of this information is printed in register with an ink containing right-handed liquid-crystal material. Both inks show the same appearance under normal illumination so that the information cannot be recognized under normal illumination conditions. The information only becomes recognizable when viewed through a suitable polarization filter since the radiation passing through the polarization filter is reflected only by one of the liquid-crystal materials so that a brightness contrast arises between the two printed layers.

One or both of the liquid-crystal materials can additionally have thermochromic properties so that suitable heating of said material, for example by the body heat of a finger, produces a color change that is testable by machine and/or visually.

If both liquid-crystal materials have thermochromic properties one obtains further interesting variants. For example the materials can be chosen so that they show a color change at the same temperature but the perceptible colors are different. In this way one can likewise represent information that becomes recognizable, disappears or alters its content through heating. One preferably uses materials that look the same under normal conditions and show different colors in contrast with each other through heating. It is also possible to use materials that become transparent or opaque through heating.

The additional thermochromic property can be incorporated directly via the chemical formulation of the liquid-crystal materials. For optimal control of the individual properties, however, it is also recommendable to mix a plurality of liquid-crystal materials, each of the liquid-crystal materials having a special property. That is, one can select for example two basic liquid-crystal components that have right- or left-handed properties and matching reflective behavior but are not thermochromic. These are mixed with corresponding thermochromic liquid-crystal materials.

The inventive security element can moreover be used not only for protecting documents of value such as bank notes, ID cards, passports, shares or the like, but can also be disposed on or in any desired objects to be protected, for example tickets, books, CDs, packages of any kind, etc.

BRIEF DESCRIPTION OF THE DRAWINGS

Further advantages and embodiments of the invention will be explained with reference to the figures, in which:

FIG. 6 shows another embodiment of the inventive security element,

FIG. 7 shows another embodiment of the inventive security element,

DETAILED DESCRIPTION OF VARIOUS EMBODIMENTS

Figure 1:
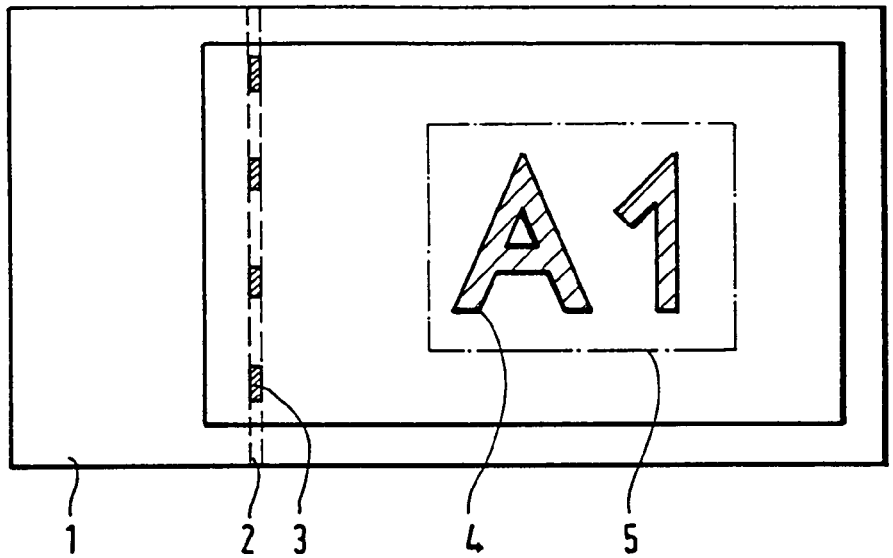
FIG. 1 shows an inventive document of value.

FIG. 1 shows inventive security document 1 in the form of a bank note. So-called window security thread 2 is woven into said bank note, passing directly to the surface of the paper in certain areas 3. The areas of thread 2 located therebetween within the paper web are shown by dash lines in the figure. Document of value 1 additionally has print 4 produced with an inventive printing ink. Print 4 forms the inventive security element. Since one does not normally produce the entire print of the document of value with the inventive printing ink, this is a locally limited security element, as indicated by area 5 limited by dash-dotted lines in FIG. 1. If necessary, however, the entire print can be done with the inventive ink.

The inventive printing ink contains an optically variable material, for example liquid-crystal pigments or interference layer pigments, as well as at least one machine-readable feature substance. The optically variable pigments can have a body color if the print is to be rather opaque. In case information or color layers located therebelow are to remain visible, one uses translucent optically variable materials without body color.

The machine-readable feature substance may be luminescent substances transparent in the visible spectral region. Transparent feature substances offer the advantage of not impairing the visual color effect of the optically variable material and not appearing visually otherwise in any way. Since forgers generally confine themselves to imitating the visual impression of an object of value, these forgeries can be discovered very easily by checking the machine-detectable property of the feature substance.

It is also possible to use magnetic pigments, in particular black magnetic pigments. The concentration of magnetic pigments must, however, be chosen so that the visual impression of the optically variable pigments is not impaired. If the magnetic pigments are added in low concentrations, they even support the optical effect of the optically variable pigments since they absorb the diffuse stray radiation.

Figure 2:
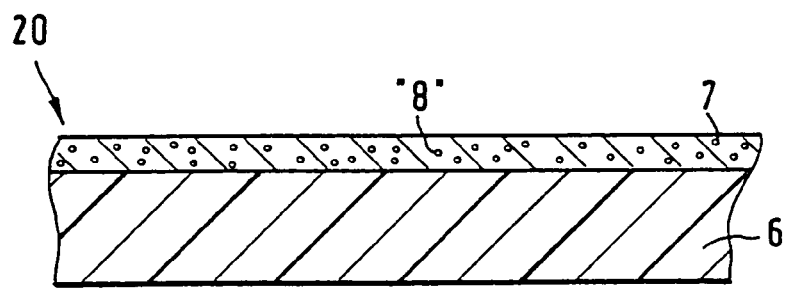
FIG. 2 shows an embodiment of the inventive security element.

FIG. 2 shows another embodiment of the inventive security element. In this case it is security thread 20 that, as already shown in FIG. 1, can be embedded in the bank note as a window security thread. It consists of carrier material 6 that can be transparent plastic material. Disposed on said carrier material is optically variable layer 7 containing feature substance 8. Optically variable layer 7 may be executed as a printed layer or likewise as a foil layer. In the case of a color layer, feature substance 8 can constitute the binder for example.

Figure 3:
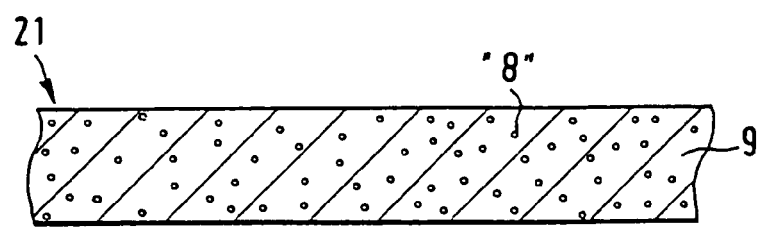
FIG. 3 shows another embodiment of the inventive security element.

FIG. 3 shows another embodiment of inventive security element 21. In this case it is self-supporting foil 9 that has both the optically variable effect and feature substance 8. Said foil can be applied in the form of labels for product protection to any kind of object to be protected. It can alternatively also serve as a cover foil, for example for passports or ID cards. Foil 9 can also be cut into bands or threads of a certain width, however, that are fastened to a document of value or product, or embedded in a paper of value as a window thread.

Figure 4:
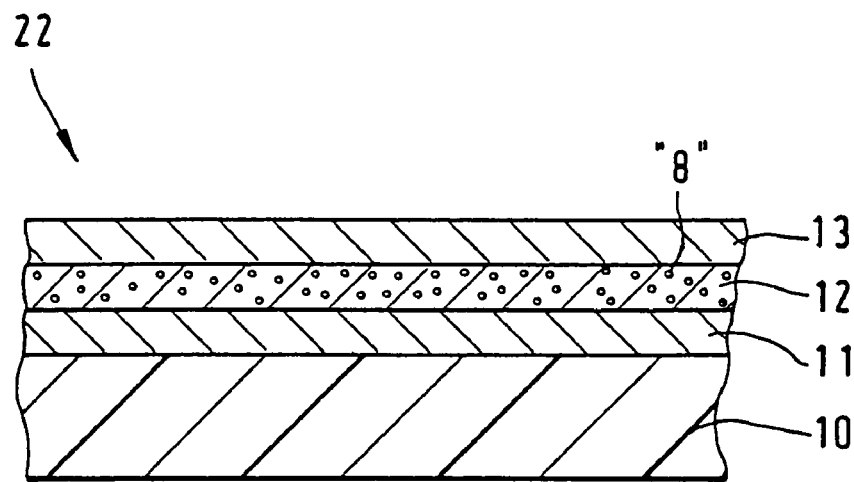
FIG. 4 shows another embodiment of the inventive security element.

FIG. 4 shows inventive transfer material 22 in whose layer structure the optically variable material and feature substance are disposed. It consists of carrier foil 10 that can be provided with separation layer 11 in order to permit the layer structure to be detached from the carrier band. Layer 12 can be formed as a foil layer or also as a printed layer and contains both feature substance 8 and the optically variable material. On layer 12 one may finally dispose adhesive layer 13, preferably a hot-melt adhesive layer. The layer sequence of transfer material 22 can of course be supplemented by additional layers depending on the application. If layer 12 is a printed layer, for example, it may be expedient to dispose another protective layer between separation layer 11 and layer 12 in order to protect the security element from harmful environmental influences after transfer to the document of value.

A feature substance can likewise be incorporated into said protective layer. Another alternative provides for incorporating the feature substance only in said protective layer so that layer 12 contains only the optically variable material.

Said transfer material 22 is then contacted with the document of value to be protected and subjected to pressure and/or heat in the areas to be transferred so that the layer structure located on carrier material 10 bonds firmly with the document material and remains on the document when carrier material 10 is then removed.

Transfer material 22 can also be used analogously to above-described self-supporting foil 9 for protecting any other desired objects.

Figure 5:
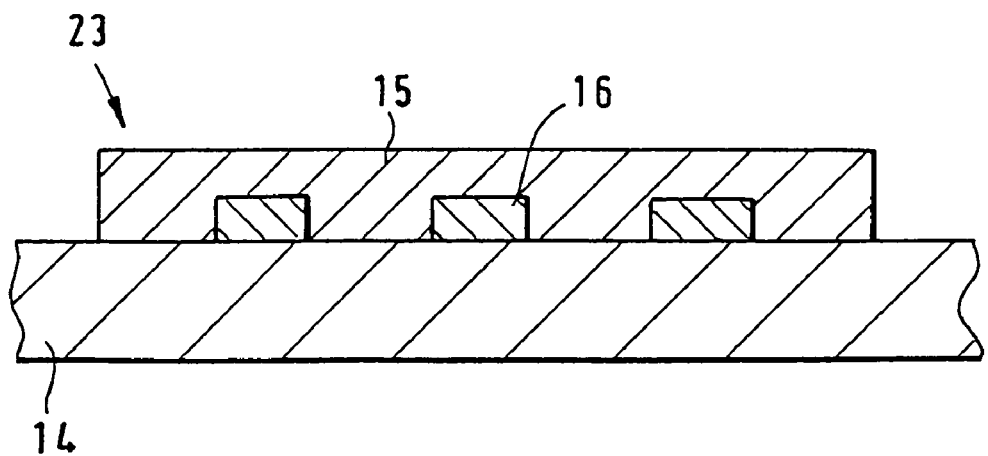
FIG. 5 shows another embodiment of the inventive security element.

FIG. 5 shows document of value 14 with another embodiment of inventive security element 23 in cross section. Document of value 14 bears dark-colored print 16 containing feature substance. Printed image 16 can represent for example a coding or alphanumeric information. Disposed thereover in a large-surface area is optically variable material 15 having no or little body color. This may be for example liquid-crystal polymer material or also interference layer material, as sold under the trade name IRIODINE® by Merck. It is preferably admixed in the form of pigments to a printing ink or brushing paint that is applied to the document. The visual effect of optically variable material 15 stands out clearly in the area of dark printed image 16 while it is only very weakly recognized in the remaining areas due to the transparency of the optically variable material and the diffuse stray radiation that occurs.

Dark printed image 16 can be produced by means of a printing ink containing magnetic pigment, or a printing ink with another feature substance admixed thereto. This may be for example a black IR-transparent ink with one or more luminescent substances emitting in the IR spectral region admixed thereto. Alternatively, one can use a printing ink containing carbon black and having an electric conductivity easily tested by machine.

Additional protection can be obtained if printed image 16 consists of a machine-detectable printing ink only in certain areas. That is, parts of entire printed image 16 are printed with a dark ink containing neither magnetic pigment nor luminescent substance and the remaining parts are produced with the ink containing feature substance. This permits not only the existence of the feature substance to be detected in the area of the optically variable material during machine testing, but additionally its distribution evaluated.

The ink used for producing printed image 16 can of course also contain a plurality of feature substances, for example a mixture of magnetic pigments and luminescent substances. It is also possible to use a plurality of optically variable materials.

This embodiment according to FIG. 5 is especially advantageous if high-resolution images are to be produced with the aid of optically variable printing inks. Due to the necessary pigment size and the platelike shape of most optically variable materials, the latter cannot be printed in the form of fine, high-resolution patterns, for example guilloches with a line thickness smaller than 0.1 mm as a positive or negative printed image. They are therefore usually applied by screen printing. Fine line thicknesses of less than 0.1 mm, on the other hand, can usually be obtained only by offset, indirect letterpress or similar processes. The feature substances can now be processed with these printing processes so that inks with feature substances can be printed with high resolution. This has the consequence that the visual effect of the optically variable material nevertheless appears as a high-resolution pattern in the finished security element due to the dark background.

Alternatively, the high-resolution pattern can be printed with a conventional dark to black ink that is supplemented by an adjoining pattern containing feature substance. The layer containing feature substance is preferably transparent in this case.

FIG. 6 shows document of value 14 on which another embodiment of inventive security element 24 is disposed. Security element 24 consists of magnetic layer 32 containing carbon black components 17. Disposed on said layer is translucent optically variable layer 15 additionally containing luminescent substance 18. Luminescent substance 18 may be for example a luminescent substance transparent in the visible spectral region and emitting in the visible spectral region under UV illumination.

This easily produced security element has several properties testable by machine and visually. One can thus use for visual testing both the optically variable material and the emission of the luminescent substance excitable by UV light. For machine evaluation one can detect the magnetic properties and the luminescence emission under UV illumination. Additionally, one can evaluate the electric conductivity produced by the carbon black admixture.

FIG. 7 shows a similar embodiment of inventive security element 25. Here, too, magnetic layer 32 with admixed carbon black is first applied to document of value 14. On said layer one then provides layer 19 containing a luminescent substance emitting in the IR spectral region. Finally, one disposes thereover optically variable layer 15 transparent in the IR spectral region.

The layers shown in FIGS. 6 and 7 do not have to be disposed congruently over each other, as shown in the figures. The magnetic layer can thus be applied in the form of a printed image, similarly to FIG. 5. The same applies to luminescent layer 19. The layers containing feature substances can also be disposed side by side, preferably directly adjacent to each other.

Figure 8:
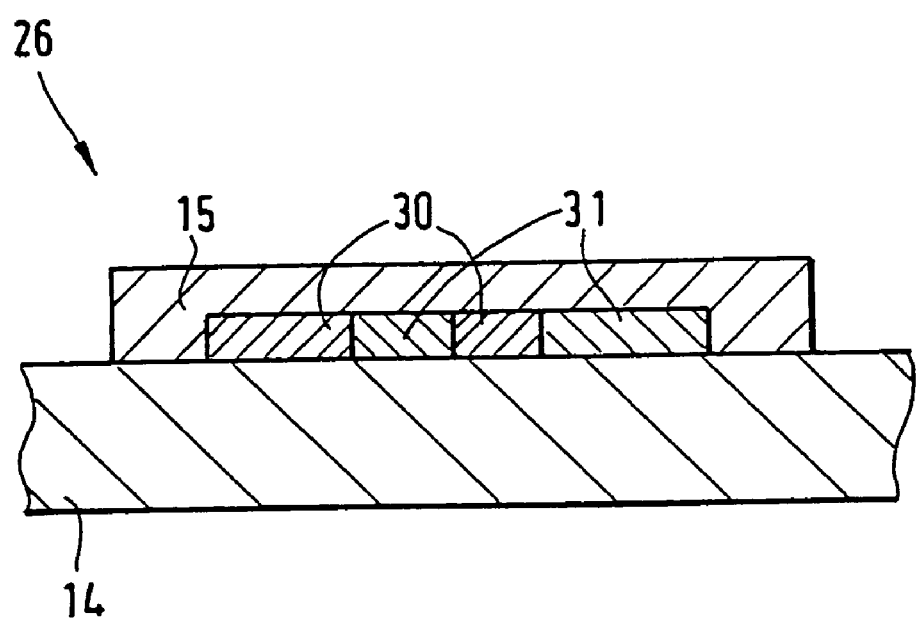
FIG. 8 shows another embodiment of the inventive security element.

FIG. 8 shows another embodiment of inventive security element 26 wherein the feature substance is applied in the form of a coding. In the example shown, a layer containing feature substance is provided on document 14 in the form of a bar code that consists of spaced-apart areas 30. Intermediate areas 31 are filled with a layer containing no feature substance but visually showing the same appearance as areas 30. Over layers 30, 31 one disposes optically variable layer 15.

Such an embodiment is especially advantageous if the optically variable material is a quasi transparent interference-layer or liquid-crystal material whose color effect is strongly accentuated by a dark background. In this case the color effect of layer 15 is accentuated in the entire area of dark to black areas 30, 31 but not the entire area has feature substance. The feature substance used may be for example an IR-absorbent substance. Said substance may simultaneously be magnetic. Areas 31 are in this case preferably printed with an IR-transparent layer.

According to another embodiment, only areas 30 may be provided, i.e. areas 31 with a camouflaging effect in the visible spectral region may be omitted.

Figure 9:
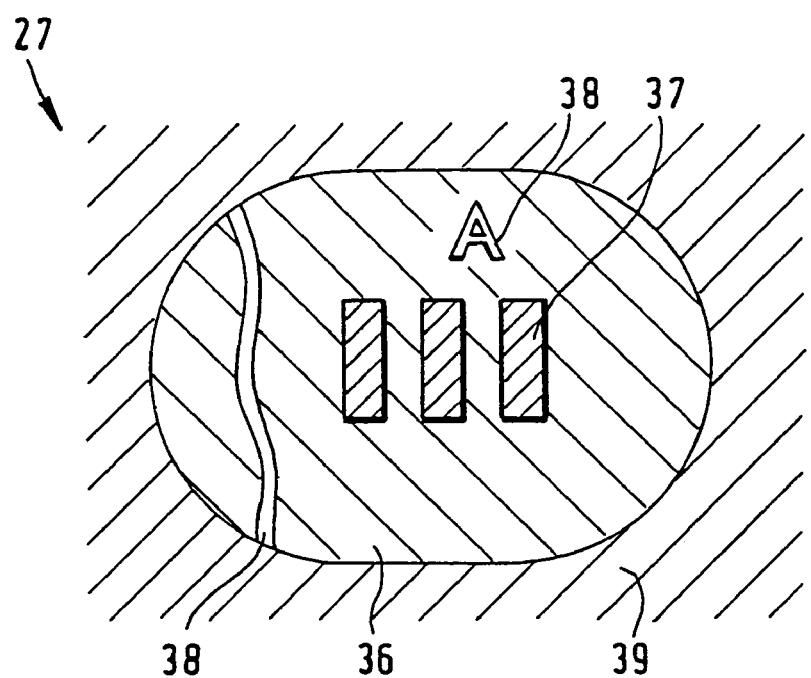
FIG. 9 shows another embodiment of the inventive security element in a front view.

FIG. 9 shows a front view of a special embodiment of the inventive security element that combines the teachings and embodiments explained with reference to FIGS. 5 and 8. Said security element 27 consists of a colored, preferably dark or black, print having in certain areas gaps 38 in the form of patterns or alphanumeric characters. In the area of print 36 there is additionally bar code 37 showing the same appearance under normal illumination conditions as print 36 so that bar code 37 is not to be recognized visually. In FIG. 9 bar code 37 has been accentuated in clearly recognizable fashion for reasons of clearness, however. Unlike print 36, the ink with which bar code 37 was produced contains a machine-detectable feature substance, preferably an IR-absorbent substance. The printed image composed of components 36, 37, 38 is covered all over by translucent layer 39, preferably a liquid-crystal layer. As explained above, the optically variable effect of layer 39 stands out clearly primarily in the area of prints 36, 37.

Security element 27 can be produced in different ways. Thus, prints 36, 37 can be printed in register side by side. That is, if print 36 is produced in the first printing cycle, the areas of bar codes 37 also remain unprinted in said printing cycle and form gaps in print 36. In the second printing cycle, bar code 37 is supplemented with ink containing feature substance. Alternatively, prints 36, 37 can be disposed one over the other. It must thereby be heeded that the ink of print 36 must not impair the machine-readability of bar code 37.

According to another variant, both print 36 and print 37 can contain a feature substance, the feature substances differing with respect to a physical property. One preferably uses IR-absorbent substances whose absorption peaks are in different spectral regions.

Figure 10:
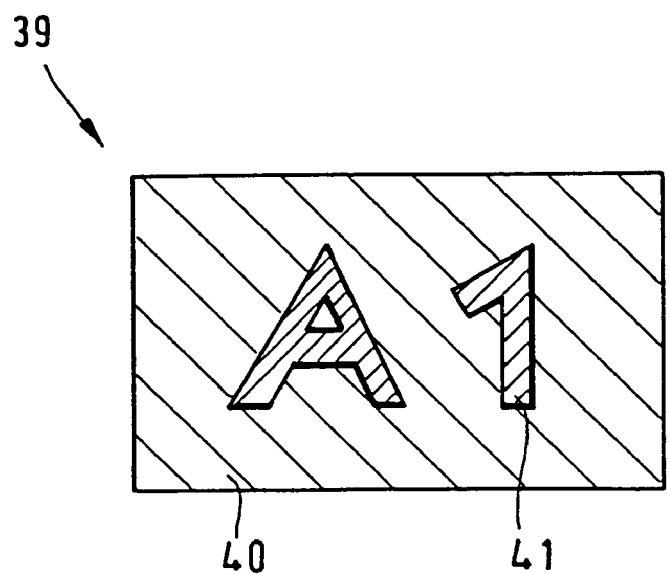
FIG. 10 shows a special embodiment of an inventive liquid-crystal layer with right- and left-handed polarization properties.

The security element can be designed more elaborately and thus also with higher forgery-proofness if the optically variable layer is composed of a plurality of optically variable materials with different physical properties. A special embodiment of such an optically variable layer is shown in FIG. 10. FIG. 10 only shows a front view of optically variable layer 39 shown in FIG. 9. In this case, optically variable layer 39 is composed of two materials with different properties. One of the optically variable materials is disposed in area 40 and the other in area 41. Area 41 has the form of alphanumeric characters in the example shown. Areas 40, 41 can also have any other contour form, however.

One preferably produces areas 40, 41 using for liquid-crystal materials with different light-polarizing properties. Depending on the chemical composition of the liquid-crystal material, only light with a certain polarization is reflected. The chemical composition can be chosen so that two liquid-crystal materials look the same visually but reflect differently polarized light.

If areas 40, 41 shown in FIG. 10 are covered with such liquid-crystal materials the information represented by areas 41 cannot be recognized under normal viewing conditions. The information becomes recognizable only when layer 39 is viewed through a polarization filter passing only light of one polarization direction.

According to another embodiment, the liquid-crystal materials disposed in areas 40, 41 can additionally be provided with a feature substance, for example a luminescent substance. Both liquid-crystal materials can be provided with the same or different feature substances, such as two different luminescent or thermochromic substances. A luminescent and a thermochromic substance are also possible since the feature substances do not need to have the same testable property. If the security element is to have thermochromic properties, the liquid-crystal materials can also be chosen so as to have both different polarization properties and different thermochromic properties.

One can thus use for area 40 a liquid-crystal material having left-handed properties and showing a color change when subjected to body heat. At the same time the material is provided with a first luminescent substance transparent in the visible spectral region. Area 41, however, is covered with a right-handed liquid-crystal material that likewise shows a color change when subjected to body heat, but contrasts in color with that of the liquid-crystal material in area 40. Said second liquid-crystal material is also provided with a second luminescent substance transparent in the visible spectral region. The emission wavelengths of the two luminescent substances differ, however. This permits the information represented by areas 40, 41 and not recognizable under normal viewing conditions to be made visible or detected with the aid of polarization filters via the polarizing properties of the liquid-crystal materials, by heating via the thermochromic properties of the liquid crystals or by excitation of the emission of the luminescent substances.

This way of designing the optically variable layer explained with reference to FIG. 10 can of course also be used in all other embodiments explained.

It is likewise possible to provide the printed layer sequences shown in FIGS. 5, 6, 7, 8 and 9 on a security thread or in a transfer material. The transfer material can be formed either as a hot stamping foil or as label material.

The invention claimed is:

1. A document of value comprising a security element having at least one optically variable material that conveys different color effects at different viewing angles, and at least one machine-readable feature substance that does not impair a visually visible optically variable effect of the optically variable material, the optically variable material and the feature substance being disposed in one layer and said layer being present in the form of information; wherein the optically variable material is an interference layer material.

2. A document of value comprising a security element having at least one optically variable material that conveys different color effects at different viewing angles, and at least one machine-readable feature substance that does not impair a visually visible optically variable effect of the optically variable material, the optically variable material and the feature substance being disposed in one layer and said layer being present in the form of information;
   wherein the machine-readable feature substance is a material luminescing including a substance that is luminescent outside a visible spectral region.

3. A document of value comprising a security element having at least one optically variable material that conveys different color effects at different viewing angles, and at least one machine-readable feature substance that does not impair a visually visible optically variable effect of the optically variable material, the optically variable material and the feature substance being disposed in one layer and said layer being present in the form of information; wherein the security element is present on the document of value as a multilayer transfer element in whose layer structure the optically variable material and feature substance are disposed.

4. A document of value comprising a security element having at least one optically variable material that conveys different color effects at different viewing angles, and at least one machine-readable feature substance that does not impair a visually visible optically variable effect of the optically variable material, the optically variable material and the feature substance being disposed in one layer and said layer being a self-supporting plastic foil;
   wherein the optically variable material is an interference layer material.

5. A document of value comprising a security element having at least one optically variable material that conveys different color effects at different viewing angles, and at least one machine-readable feature substance that does not impair a visually visible optically variable effect of the optically variable material, the optically variable material and the feature substance being disposed in one layer and said layer being a self-supporting plastic foil; wherein the machine-readable feature substance is a material luminescing including a substance that is luminescent outside a visible spectral region.

6. A document of value comprising a security element having at least one optically variable material that conveys different color effects at different viewing angles, and at least one machine-readable feature substance that does not impair a visually visible optically variable effect of the optically variable material, the optically variable material and the feature substance being disposed in one layer and said layer being a self-supporting plastic foil; wherein the security element is present on the document of value as a multilayer transfer element in whose layer structure the optically variable material and feature substance are disposed.

* * * * *